(12) United States Patent
Inoue et al.

(10) Patent No.: US 6,716,263 B2
(45) Date of Patent: Apr. 6, 2004

(54) AIR SUCTION DEVICE FOR USE IN SURFACE BOAT

(75) Inventors: Toshiyuki Inoue, Shizuoka (JP); Mitsuo Itou, Shizuoka (JP)

(73) Assignee: Yamato Giken Kabushiki Kaisha, Shizuoka (JP)

( * ) Notice: Subject to any disclaimer, the term of this patent is extended or adjusted under 35 U.S.C. 154(b) by 43 days.

(21) Appl. No.: 10/060,986

(22) Filed: Jan. 30, 2002

(65) Prior Publication Data

US 2002/0104298 A1 Aug. 8, 2002

(30) Foreign Application Priority Data

Feb. 5, 2001 (JP) .......................................... 2001-27629

(51) Int. Cl.[7] .............................................. B63H 21/38
(52) U.S. Cl. ................. 55/385.1; 55/385.3; 123/198 E; 440/46; 440/47; 440/72; 440/88 A; 440/113
(58) Field of Search .............................. 55/385.1, 385.3; 123/198 E; 440/46, 47, 72, 88 A, 113

(56) References Cited

U.S. PATENT DOCUMENTS

| | | | | |
|---|---|---|---|---|
| 5,815,881 A | * | 10/1998 | Sjogreen | 15/321 |
| 6,343,964 B1 | * | 2/2002 | Mardikian | 440/46 |
| 6,454,622 B2 | * | 9/2002 | Mashiko et al. | 440/89 |

FOREIGN PATENT DOCUMENTS

| | | |
|---|---|---|
| JP | 08254162 | 10/1996 |
| JP | 2001132562 | 5/2001 |

* cited by examiner

*Primary Examiner*—Minh-Chau T. Pham
(74) *Attorney, Agent, or Firm*—Boyle Fredrickson Newholm Stein & Gratz S.C.

(57) ABSTRACT

An air suction device for a surface boat having a filter element of paper type arranged in an air suction passage of an engine. The filter element is composed of a core made of a filter material and a permeable waterproof sheet arranged at the upstream side surface of the core in the air suction passage.

8 Claims, 3 Drawing Sheets

AIR SUCTION DEVICE FOR USE IN SURFACE BOAT

BACKGROUND OF THE INVENTION

1. Field of the Invention

The present invention relates to an air suction device for use in a surface boat, and more particularly to an air suction device having an air cleaner for use in a surface boat, such as a surface bicycle to be forwarded by a water jet stream.

2. Description of the Prior Art

A surface boat for use in the sports or the competition games is liable to turn over. Accordingly, it is necessary to stop the engine of the surface boat as soon as the surface boat is turned over. Further, water is entered into the air cleaner and the engine room passing through the filter member, so that the output of the engine may be reduced, when the surface boat is turned over.

Specifically, even if a little water is entered into the air cleaner, the water is also entered into the engine room passing through the filter element of the air cleaner, because the filter element of the air cleaner for use in the surface boat is normally of paper type. As a result, the output property of the engine is degraded and the restart of the engine becomes difficult, so that the surface boat cannot be run, ever if the turned over surface boat is restored. Further, it is necessary to replace the wetted filter element or to dry, so that the maintenance becomes difficult.

SUMMARY OF THE INVENTION

Accordingly, it is an object of this invention to provide an air suction device for a surface boat free from the above defects.

An air suction device for a surface boat of this invention is characterized by comprising a filter element of paper type arranged in an air suction passage of an engine, wherein the filter element is composed of a core made of a filter material and a permeable waterproof sheet arranged at the upstream side surface of the core in the air suction passage.

Further, an air suction device for a surface boat of this invention is characterized by comprising a filter element of paper type arranged in an air suction passage of an engine, wherein the filter element is composed of a core made of a filter material and permeable waterproof sheets arranged at the upstream and downstream sides of the core in the air suction passage.

Furthermore, an air suction device for a surface boat of this invention is characterized by comprising an air suction box for communicating an air suction pipe of an engine with an air suction cylinder, a filter element of paper type arranged between the air suction pipe and the air suction cylinder in the air suction box, and a buffer room of a large capacity formed between the air suction pipe and the filter element, wherein the filter element is composed of a core made of a filter material and a permeable waterproof sheet arranged at the upstream side surface of the core in the air suction box.

According to an air suction device for a surface boat of this invention, a filter element is prevented from being wetted with water entered into an air cleaner through an air suction cylinder by a waterproof sheet arranged at the upstream side of the filter element.

Further, the water is prevented from entering into an engine room.

Furthermore, a suction air pressure applied through a suction air passage to the filter element is reduced by a buffer room formed in an air suction box.

Other object and advantages will become apparent from the following description of the preferred embodiments taken in conjunction with the accompanying drawings.

DESCRIPTION OF THE PREFERRED EMBODIMENTS

Figure 1:
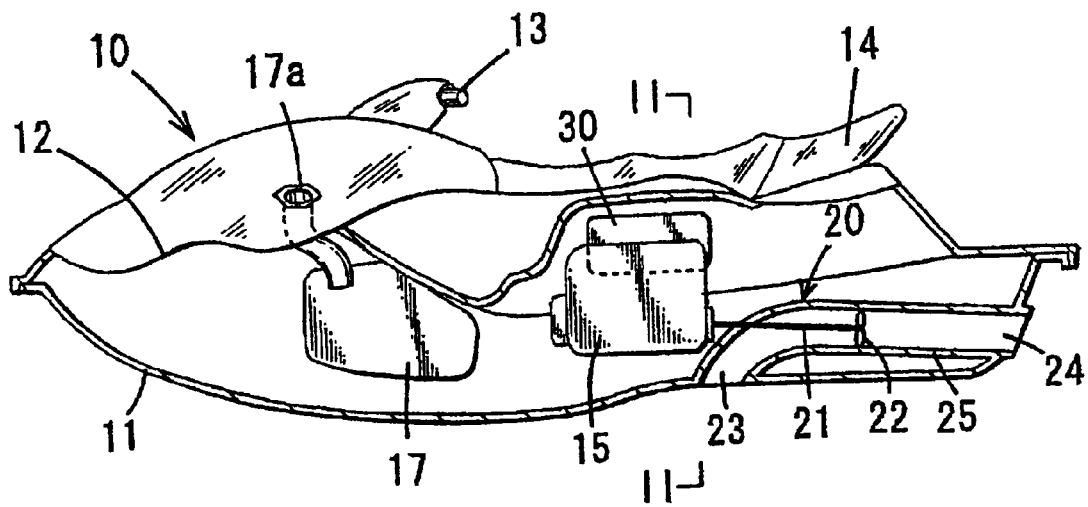
FIG. 1 is a vertically sectioned side view of an air suction boat having a suction device in accordance with the present invention.
Figure 2:
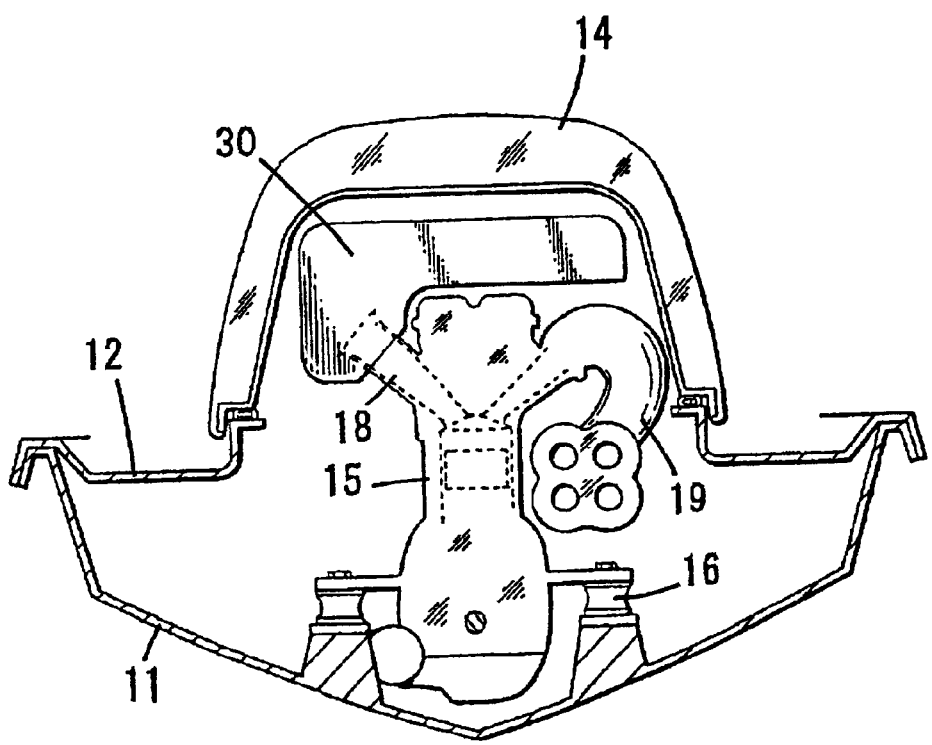
FIG. 2 is a sectional view of the air suction device taken along line II—II of FIG. 1.
Figure 3:
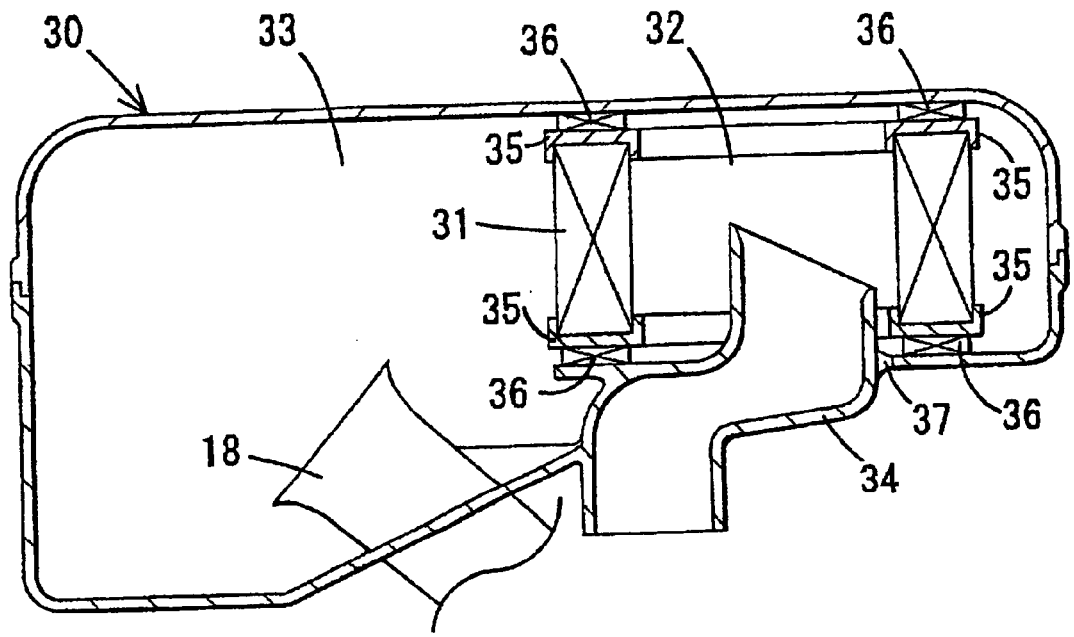
FIG. 3 is an enlarged view of a portion of the air suction device in accordance with the present invention.

FIG. 1 to FIG. 3 show a surface boat 10, such as a surface bicycle to be forwarded by a water jet stream according to the present invention. The water bicycle 10 comprises a bottom shell 11 formed of a fiber reinforced plastic in the shape of V, and a deck 12.

A reference numeral 13 denotes a steering handle, 14 denotes a seat for a crew, 15 denotes a four-stroke engine formed of four cylinders connected in series, arranged directly below a swelling portion of the deck 12, and fixed to the bottom shell 11 through rubber dampers 16, 17 denotes a fuel tank mounted in front of the four-stroke engine 15, 17a denotes a fuel supply port opened above the deck 12, 18 denotes an air suction pipe of the engine 15, 19 denotes an exhaust pipe of the engine 15, 20 denotes a propelling device, 21 denotes a propeller shaft, 22 denotes a propeller driven by the engine 15 through the propeller shaft 21, 23 denotes a water suction pipe opened at the bottom shell 11, 24 denotes an ejection port opened at the stern of the bottom shell 11 for ejecting a water jet of high speed formed by the propeller 22, 25 denotes a water pipe for connecting the water suction pipe 23 and the ejection port 24, and 30 denotes an air suction box made of a synthetic resin comprising upper and lower half portions.

The air suction box 30 comprises an air cleaner portion 32 having at both sides thereof filter elements 31 of paper type, a buffer room 33 of a large capacitor communicated with the downstream side of the filter element 31, an air suction cylinder 34 for communicating the inside of the air cleaner 32 to the atmosphere, so as to introduce air into the air cleaner portion 32, and a water discharge port 37 provided for discharging water invaded into the air suction box 30.

Figure 4:
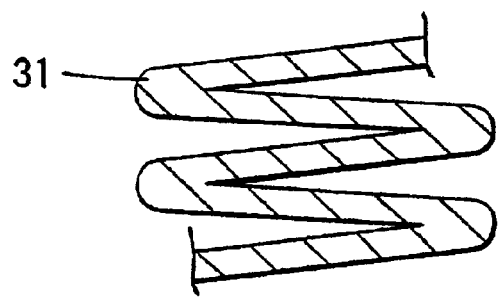
FIG. 4 is a sectional view of a portion of a filter element of the air suction device according to the present invention.
Figure 5:
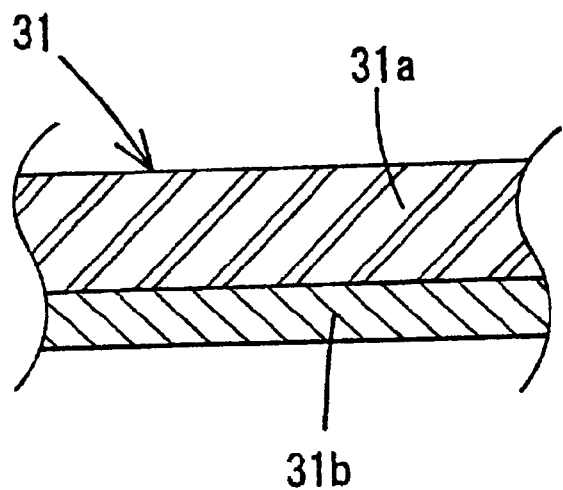
FIG. 5 is an enlarged view of a portion of the filter element shown in FIG. 4.
Figure 6:
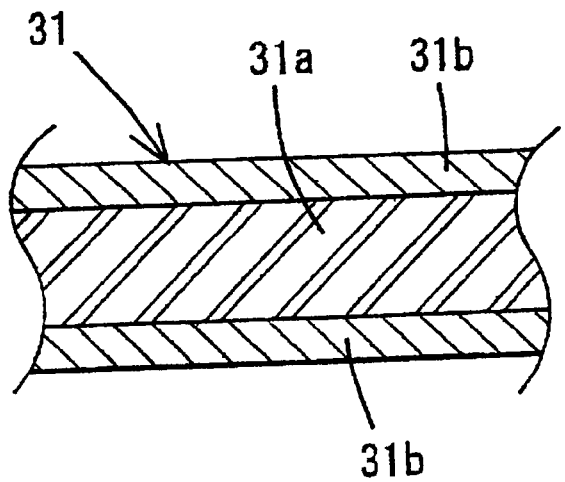
FIG. 6 is an enlarged view of a portion of the filter element of the other embodiment of the invention.

The upper and lower ends of the filter element 31 are closed by end plates 35. The filter elements 31 are fixed by annular seal members 36 to the air suction box 30. The filter element 31 is folded in a zigzag fashion as shown in FIG. 4, and formed of a core 31a of a nonwoven fabric. Both ends of the core 31a are connected together to form an annular filter element 31. As shown in FIG. 5, a waterproof sheet 31b of good permeability may be attached on the upstream side surface of the core 31a of the filter element 31 or as shown in FIG. 6, the waterproof sheet 31b may be attached on each of the both side surfaces of the core 31a. The waterproof sheet 31b can be arranged separately with an air gap from the core 31a.

According to the filter element 31 of the present invention, water is repelled by the waterproof sheet 31b and prevented from entering into the core 31a and the air suction box 30, even if the surface bicycle 10 is turned over and thus the air cleaner portion 32 is filled with water through the air suction cylinder 34.

Normally, the surface bicycle 10 is stopped automatically due to the deenergization of an ignition circuit of the engine, if the surface bicycle is turned over and thus the crew is thrown out from the surface bicycle 10, or the crew is jumped off the surface bicycle. A pulsating high negative air pressure may be generated and applied to the air suction box 30 through the air suction pipe 18, if the four-stroke engine 15 is not stopped perfectly directly after the turn over of the surface bicycle. In this case, however, the air pressure is reduced, because the capacity of the air suction box 30 is larger than the cross sectional area of the air suction pipe 18. According to the present invention, such a defect that the function of the filter element 31 is disturbed by water or the engine 15 is invaded with water through the air suction pipe 18 can be prevented by such a simple construction that the water is prevented from entering into the core 31a of the filter element 31 by the waterproof sheet 31b. Further, according to the present invention, the high negative pressure applied to the air suction box 30 through the air suction pipe 18 can be reduced by the buffer room 33.

While the invention has been particularly shown and described with reference to the preferred embodiments thereof, it will be understood by those skilled in the art that various changes in form and details may be made therein without departing from the spirit and scope of the invention as defined by the appended claims.

What is claimed is:

1. An air suction device for a surface boat comprising:

a filter element that is composed of paper and that is arranged in an air suction passage of an engine, wherein the filter element is composed of a) a core made of a filter material and b) a permeable waterproof sheet arranged at an upstream side surface of the core in the air suction passage.

2. An air suction device for a surface boat comprising:

a filter element that is composed of paper and that is arranged in an air suction passage of an engine, wherein the filter element is composed of a) a core made of a filter material and b) permeable waterproof sheets arranged at upstream and downstream sides of the core in the air suction passage.

3. An air suction device for a surface boat comprising:

an air suction box for communicating an air suction pipe of an engine with an air suction cylinder, a filter element that is composed of paper and that is arranged between the air suction pipe and the air suction cylinder in the air suction box, and a buffer room of a large capacity formed between the air suction pipe and the filter element, wherein the filter element is composed of a) a core made of a filter material and b) a permeable waterproof sheet arranged at an upstream side surface of the core in the air suction box.

4. An air suction device for a surface boat comprising:

an air suction box for communicating an air suction pipe of an engine with an air suction cylinder, a filter element that is composed of paper and that is arranged between the air suction pipe and the air suction cylinder in the air suction box, and a buffer room of a large capacity formed between the air suction pipe and the filter element, wherein the filter element is composed of a) a core made of a filter material and b) permeable waterproof sheets arranged at the upstream and downstream sides of the core in the air suction box.

5. The air suction device according to claim 1, wherein the core is made from a non-woven material.

6. The air suction device according to claim 2, wherein the core is made from a non-woven material.

7. The air suction device according to claim 3, wherein the core is made from a non-woven material.

8. The air suction device according to claim 4, wherein the core is made from a non-woven material.

* * * * *